(12) United States Patent
Lv et al.

(10) Patent No.: US 9,806,850 B2
(45) Date of Patent: Oct. 31, 2017

(54) METHOD AND APPARATUS FOR TRANSMITTING UPLINK CONTROL INFORMATION

(75) Inventors: Yongxia Lv, Beijing (CN); Yan Cheng, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 32 days.

(21) Appl. No.: 13/488,695

(22) Filed: Jun. 5, 2012

(65) Prior Publication Data

US 2012/0243511 A1 Sep. 27, 2012

Related U.S. Application Data

(63) Continuation of application No. PCT/CN2010/079508, filed on Dec. 7, 2010.

(30) Foreign Application Priority Data

Dec. 7, 2009 (CN) .......................... 2009 1 0254310

(51) Int. Cl.
*H04L 1/00* (2006.01)
*H04L 1/16* (2006.01)
(Continued)

(52) U.S. Cl.
CPC .......... *H04L 1/0031* (2013.01); *H04L 1/0073* (2013.01); *H04L 1/1671* (2013.01);
(Continued)

(58) Field of Classification Search
CPC ........ H04B 2201/70718; H04L 1/0031; H04L 1/0073; H04L 1/1671; H04L 1/0026; H04L 1/1861; H04L 5/0053
See application file for complete search history.

(56) References Cited

U.S. PATENT DOCUMENTS

| 2006/0067279 | A1 | 3/2006 | Kim et al. | |
| 2007/0217328 | A1* | 9/2007 | A.M. Bune et al. | ......... 370/208 |

(Continued)

FOREIGN PATENT DOCUMENTS

| CN | 101048967 A | 10/2007 |
| CN | 101217682 | 7/2008 |

(Continued)

OTHER PUBLICATIONS

3$^{rd}$ Generation Partnership Project; Technical Specification Group Radio Access Network; Evolved Universal Terrestrial Radio Access (E-UTRA); Multiplexing and channel coding (Release 8), 3GPP TS 36.212 V8.7.0 (May 2009), pp. 1-60.

(Continued)

*Primary Examiner* — Walter Divito
(74) *Attorney, Agent, or Firm* — Staas & Halsey LLP

(57) ABSTRACT

In the field of wireless communication, a method and an apparatus for transmitting Uplink Control Information (UCI) are provided. The method includes: determining a codeword corresponding to the UCI among multiple codewords according to a preset rule when the UCI is transmitted on a Physical Uplink Shared Channel (PUSCH) with the multiple codewords (101); and transmitting the UCI by mapping the UCI onto the corresponding codeword (102). The apparatus includes a determining unit and a transmitting unit. The method and the apparatus provide a solution to transmitting UCI on a PUSCH with multiple codewords. This solution can be implemented easily based on LTE R8, without involving too much additional work of standardization.

13 Claims, 8 Drawing Sheets

(51) Int. Cl.
*H04L 1/18* (2006.01)
*H04L 5/00* (2006.01)

(52) U.S. Cl.
CPC .......... *H04L 1/0026* (2013.01); *H04L 1/1861* (2013.01); *H04L 5/0053* (2013.01)

(56) References Cited

U.S. PATENT DOCUMENTS

| | | | |
|---|---|---|---|
| 2008/0175194 A1* | 7/2008 | Blanz | H04J 13/0044 370/329 |
| 2009/0041139 A1 | 2/2009 | Cho et al. | |
| 2009/0161613 A1* | 6/2009 | Kent | H04L 1/0016 370/329 |
| 2009/0232070 A1 | 9/2009 | Muharemovic et al. | |
| 2009/0238121 A1* | 9/2009 | Kotecha | 370/329 |
| 2009/0262695 A1 | 10/2009 | Chen et al. | |
| 2009/0262856 A1* | 10/2009 | Onggosanusi et al. | 375/267 |
| 2010/0135181 A1* | 6/2010 | Earnshaw | H04W 28/06 370/252 |
| 2010/0195594 A1 | 8/2010 | Seo et al. | |
| 2010/0272019 A1 | 10/2010 | Papasakellariou et al. | |
| 2010/0315989 A1* | 12/2010 | Reznik et al. | 370/315 |
| 2011/0080903 A1* | 4/2011 | Yin | H04L 1/0067 370/345 |
| 2011/0134860 A1 | 6/2011 | Dai et al. | |
| 2011/0194514 A1* | 8/2011 | Lee et al. | 370/329 |

FOREIGN PATENT DOCUMENTS

| | | |
|---|---|---|
| CN | 101299655 | 11/2008 |
| CN | 101330307 | 12/2008 |
| CN | 101409894 | 7/2012 |
| CN | 102013938 | 7/2012 |
| EP | 2 512 053 A1 | 10/2012 |
| JP | 2012-521166 A | 9/2012 |
| JP | 5616458 | 10/2014 |
| WO | WO 2008/067358 A2 | 6/2008 |
| WO | 2009/011511 | 1/2009 |
| WO | 2009/022872 | 2/2009 |
| WO | 2009/035297 A2 | 3/2009 |
| WO | 2009/089289 A1 | 7/2009 |
| WO | 2009/099301 | 8/2009 |
| WO | 2009/116760 A2 | 9/2009 |
| WO | WO2009/145525 | 12/2009 |
| WO | WO2010/107779 | 9/2010 |
| WO | WO2010/148319 | 12/2010 |

OTHER PUBLICATIONS

Notice of Reasons for Rejection, dated Jul. 3, 2013, in corresponding Japanese Application No. 2012-512347 (9 pp.).
3GPP TS 26.212 V8.7.0, "3rd Generation Partnership Project; Technical Specification Group Radio Access Network; Evolved Universal Terrestrial Radio Access (E-UTRA); Multiplexing and channel coding (Release 8)", May 2009, pp. 1-60.
Alcatel-Lucent, "Limitations of CQI Compression for Dual Codeword MIMO", 3GPP TSG RAN WG1 #51, Jan. 2008, pp. 1-5.
International Search Report issued Mar. 10, 2011 in corresponding International Patent Application No. PCT/CN2010/079508.
Written Opinion of the International Searching Authority issued Mar. 10, 2011 in corresponding International Patent Application No. PCT/CN2010/079508.
First Chinese Office Action issued Aug. 10, 2011 in corresponding Chinese Patent Application No. 200910254310.5.
Second Chinese Office Action issued Dec. 31, 2011 in corresponding Chinese Patent Application No. 200910254310.5.
International Search Report of Corresponding PCT Application PCT/CN2010/079508 mailed Mar. 10, 2011.
Ericsson, ST-Ericsson, "Resource Allocation for UCI on PUSCH", TSG-RAN WG1 #61bis, Jun. 28-Jul. 2, 2010, 11 pages.
Huawei, "Simultaneous transmission of uplink channels or signals", 3GPP TSG RAN WG1 Meeting #62, Aug. 2010, 10 pages.
LG Electronics, "Channel coding for UCI on PUSCH", 3GPP TSG RAN WG1 Meeting #63, Nov. 2010, 4 pages.
Huawei, HiSilicon, "Coding and resource mapping for UCI on PUSCH", 3GPP TSG RAN WG1 Meeting #63, Nov. 2010, 5 pages.
Huawei, HiSilicon, "Enhancement for transmission for UCI on PUSCH", 3GPP TSG RAN WG1 Meeting #66, Aug. 2011, 2 pages.
Extended European Search Report issued Sep. 7, 2012 in corresponding European Patent Application No. 10835471.3.
European Office Action dated May 28, 2014 in related European Patent Application No. 10835471.3-1860 (10 pages).
Chinese Office Action dated Jun. 16, 2014 in related Chinese Patent Application No. 201210184650.7 (4 pages).
Chinese Search Report dated Mar. 27, 2014 in related Chinese Patent Application No. 2012101846507 (2 pages).
Japanese Office Action dated Jun. 30, 2015 in corresponding Japanese Patent Application No. 2014-184905.
Texas Instruments, "Further Analysis on Uplink SU-MIMO for E-UTRA", 3GPP TSG RAN WG1 #55bis, Ljubljana, Slovenia, Jan. 2009, pp. 1-8.
Japanese Office Action mailed May 24, 2016 in related Japanese Patent Application No. 2014-184905 (3 pages) (4 pages English Translation).

* cited by examiner

METHOD AND APPARATUS FOR TRANSMITTING UPLINK CONTROL INFORMATION

CROSS-REFERENCE TO RELATED APPLICATIONS

This application is a continuation of International Application No. PCT/CN2010/079508, filed on Dec. 7, 2010, which claims priority to Chinese Patent Application No. 200910254310.5, filed on Dec. 7, 2009, both of which are hereby incorporated by reference in their entireties.

FIELD OF THE INVENTION

The present invention relates to the field of wireless communication, and in particular, to a method and an apparatus for transmitting Uplink Control Information (UCI), and more particularly, to a method and an apparatus for transmitting UCI on a Physical Uplink Share Channel (PUSCH) with multiple codewords.

BACKGROUND OF THE INVENTION

In a Long Term Evolution (LTE) R8 wireless communication system, in order to support technologies such as dynamic scheduling, downlink Multiple Input Multiple Output (MIMO) transmission and Hybrid Automatic Repeat Request (HARQ), a terminal needs to feed back a variety of UCIs to an eNodeB through a Physical Uplink Control Channel (PUCCH) and a PUSCH. Examples of the UCI are channel quality indication, coding matrix indication, and acknowledgement information intended for HARQ. Specifically, the UCI fed back through a PUSCH includes: Channel Quality Information (CQI), Rank Indication (RI), and Hybrid Automatic Repeat request-Acknowledgment (HARQ-ACK). When the MIMO transmission mode is closed-loop space division multiplexing and Multi-User MIMO (MU-MIMO), the CQI includes channel quality indication information and coding matrix indication information; in other transmission modes, the CQI is channel quality indication information.

In the LTE R8, the PUSCH supports only one codeword in one Transmission Time Interval (TTI). The codeword corresponds to bits of one transport block after channel coding. When the UCI and the data need to be sent through the PUSCH within the same TTI, the detailed procedure is as follows:

(1) The terminal calculates the number of modulation symbols for various UCIs;

(2) The terminal calculates the number of bits of various UCIs after channel coding;

(3) The terminal performs operations related to channel coding for the data, CQI, RI, and HARQ-ACK, then multiplexes the coded data and coded CQI, and finally performs channel interleaving for the multiplexed bits, coded bits of the RI, and coded bits of the HARQ-ACK;

(4) The terminal performs a series of operations such as scrambling, modulation, Discrete Fourier Transform (DFT), and resource mapping for the bits that have undergone channel interleaving, and then sends the bits to the eNodeB;

(5) The eNodeB processes the received bits, and performs channel deinterleaving and demultiplexing to separate the CQI, RI and HARQ-ACK from the data; and (6) The eNodeB performs channel decoding, judges whether the transmitted UCI is correct. If the transmitted UCI is correct, the eNodeB obtains the original information bits of the transmitted CQI, RI and HARQ-ACK.

The foregoing method is a method for transmitting UCI in which the PUSCH supports one codeword in one TTI. With evolution of technologies, a PUSCH may support multiple codewords in one TTI. For example, when a spatial multiplexing technology with time domain layer shifting or without time domain layer shifting is adopted, a PUSCH supports up to two codewords in one TTI. Therefore, it is necessary to work out a method for transmitting UCI in which a PUSCH supports multiple codewords in a TTI. How to transmit UCI on a PUSCH with multiple codewords is a new problem, for which there is no related prior art currently.

SUMMARY OF THE INVENTION

In order to solve the problem of transmitting UCI on a PUSCH with multiple codewords, embodiments of the present invention provide a method and an apparatus for transmitting UCI. The technical solutions are as follows:

A method for transmitting UCI, which includes:
determining a codeword corresponding to the UCI among multiple codewords according to a preset rule when the UCI is transmitted on a PUSCH with multiple codewords; and
transmitting the UCI by mapping the UCI onto the corresponding codeword.

An apparatus for transmitting UCI, which includes:
a determining unit, configured to determine a codeword corresponding to the UCI among multiple codewords according to a preset rule when the UCI is transmitted on a PUSCH with multiple codewords; and
a transmitting unit, configured to transmit the UCI by mapping the UCI onto the corresponding codeword.

The technical solutions according to the embodiments of the present invention solve the problem about how to transmit UCI on a PUSCH with multiple codewords. The solutions can be implemented easily based on LTE R8, without involving too much additional work of standardization.

DETAILED DESCRIPTION OF THE EMBODIMENTS

To make the objectives, technical solutions, and merits of the present invention clearer, the following describes the embodiments of the present invention in more detail with reference to accompanying drawings.

Figure 1:
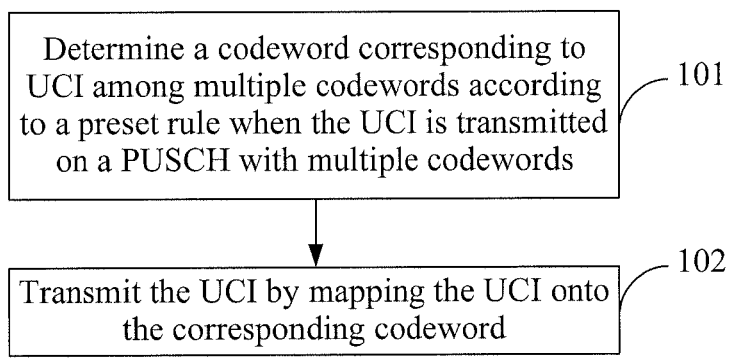
FIG. 1 is a flowchart of a method for transmitting UCI according to an embodiment of the present invention.

As shown in FIG. 1, a method for transmitting UCI in an embodiment of the present invention includes the following steps:

101. Determine a codeword corresponding to the UCI among multiple codewords according to a preset rule when the UCI is transmitted on a PUSCH with multiple codewords.

102. Transmit the UCI by mapping the UCI onto the corresponding codeword.

The foregoing method is a solution to transmitting UCI on multiple codewords, supports LTE R8, LTE R9 and higher versions of LTE, and is a new technology in this field. When the method is applied to LTE R8, because only one codeword exists, the codeword is directly determined as the codeword corresponding to the UCI, and transmit the UCI by mapping the UCI onto this codeword.

In this embodiment, the UCI may be any type of UCI, including but not limited to: CQI, RI, HARQ-ACK, or channel information and so on. The type of the UCI is not limited herein. There may be one or more UCIs to be transmitted in this embodiment. One UCI refers to control information corresponding to one coded block of control information. When there are multiple UCIs to be transmitted, any two of the UCIs may be with the same type or different types. For example, there are three UCIs to be transmitted, all of the three UCIs may be CQIs; or, one is CQI, one is RI, and the rest is HARQ-ACK.

In this embodiment, a variety of preset rules are presented, which include but are not limited to: transmitting one UCI by mapping the one UCI onto one codeword; transmitting one UCI by dividing the one UCI into multiple parts and mapping the multiple parts to multiple codewords respectively; and, transmitting multiple UCIs by mapping the multiple UCIs onto one codeword.

The preset rules are not limited herein. The method is expounded below with reference to four embodiments. The preset rules in any of the four embodiments below are applicable.

Embodiment 1

Figure 2:
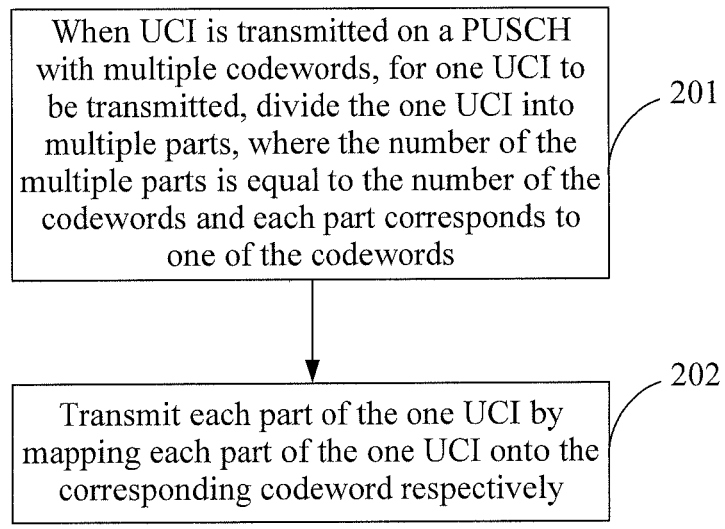
FIG. 2 is a flowchart of a method for transmitting UCI according to embodiment 1 of the present invention.

As shown in FIG. 2, this embodiment provides a method for transmitting UCI, in which one UCI is divided into multiple parts and then the multiple parts are transmitted along with multiple codewords respectively. The method includes the following steps:

201. When UCI is transmitted on a PUSCH with multiple codewords, for one UCI to be transmitted, divide the one UCI into multiple parts, where the number of the multiple parts is equal to the number of the multiple codewords and each part corresponds to one of the codewords.

For example, if there are two codewords, e.g., codeword 1 and codeword 2, one UCI is divided into two parts, e.g.,
UCI1 and UCI2. UCI1 corresponds to codeword 1, and UCI2 corresponds to codeword 2.

The UCI may be divided into multiple parts in many methods. The methods of dividing are not limited herein. Any two of the multiple parts may be of the same length or different lengths.

202. Transmitting the UCI by mapping each part of the UCI onto the corresponding codeword respectively.

Figure 3:
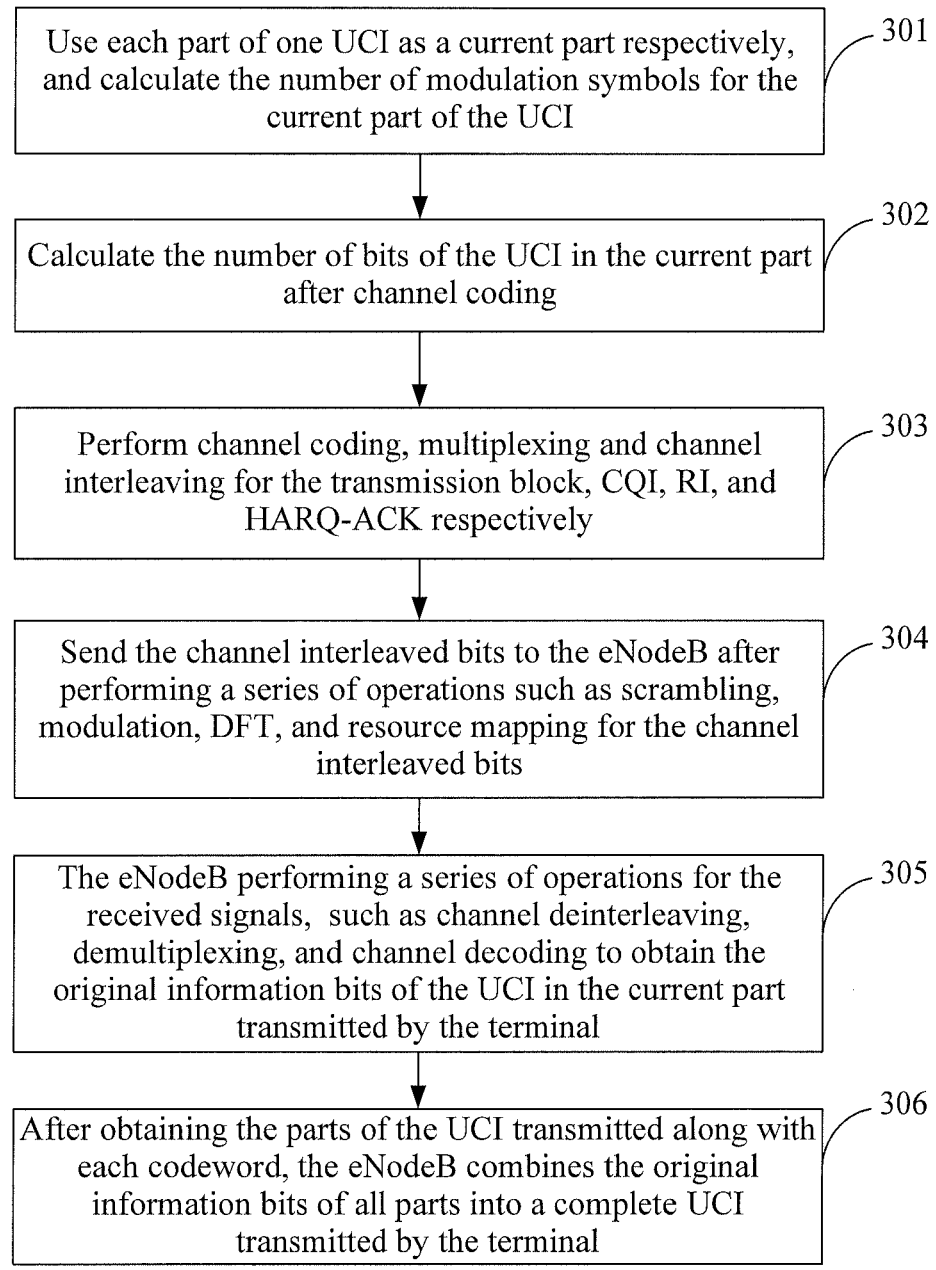
FIG. 3 is a flowchart of how an eNodeB processes received UCI after the UCI is divided into multiple parts and each part is mapped to a corresponding codeword for transmission according to embodiment 1 of the present invention.

In this embodiment, each part of the UCI is processed in the same way. As shown in FIG. 3, the process of step 202 may be implemented in the following detailed steps:

301. Use each part of the UCI as a current part, and calculate the number (Q') of modulation symbols for the current part of the UCI.

Specifically, if the current part of the UCI is HARQ-ACK or RI, apply formula (1) for calculation; if the current part of the UCI is CQI, apply formula (2) for calculation.

$$Q' = \min\left(\left\lceil \frac{O \cdot M_{sc}^{PUSCH\text{-}initial} \cdot N_{symb}^{PUSCH\text{-}initial} \cdot \beta_{offset}^{PUSCH}}{\sum_{r=0}^{C-1} K_r} \right\rceil, 4 \cdot M_{sc}^{PUSCH}\right) \quad (1)$$

$$Q' = \min\left(\left\lceil \frac{(O+L) \cdot M_{sc}^{PUSCH\text{-}initial} \cdot N_{symb}^{PUSCH\text{-}initial} \cdot \beta_{offset}^{PUSCH}}{\sum_{r=0}^{C-1} K_r} \right\rceil, \right. \quad (2)$$

$$\left. M_{sc}^{PUSCH} \cdot N_{symb}^{PUSCH} - \frac{Q_{RI}}{Q_m}\right)$$

In the formulae above, O is the number of original information bits of UCI in the current part; $M_{sc}^{PUSCH\text{-}initial}$ is the transmission bandwidth for initial PUSCH transmission for the same transport block; $N_{symb}^{PUSCH\text{-}initial}$ is the number of SC-FDMAs for initial PUSCH transmission for the same transport block; $\beta_{offset}^{PUSCH}$ is an Modulation and Coding Scheme (MCS) offset of UCI in the current part over data; $M_{sc}^{PUSCH}$ is transmission bandwidth of the PUSCH; $K_r$ is a sum of the number of information bits of code block r and the number of Cyclic Redundancy Check (CRC) bits; C is the number of code blocks; $N_{symb}^{PUSCH1}$ is the number of SC-FDMAs for the same transport block; $Q_{RI}$ is the number of modulation symbols for the RI; L is the number of CRC bits, and L is 0 when the CQI is encoded by Reed-Muller (RM) coding and is 8 when the CQI is encoded by convolution coding; $Q_m$ is the modulation order; when the UCI is HARQ-ACK, $\beta_{offset}^{PUSCH} = \beta_{offset}^{HARQ\text{-}ACK}$; when the UCI is RI, $\beta_{offset}^{PUSCH} = \beta_{offset}^{RI}$; when the UCI is CQI, $\beta_{offset}^{PUSCH} = \beta_{offset}^{CQI}$.

302. Calculate the number of bits of UCI in the current part after channel coding.

Specifically, apply formula (3) to calculate:

$$Q = Q_m \cdot Q' \quad (3)$$

In the formula above, Q is the number of bits of UCI in the current part after channel coding; $Q_m$ is the modulation order; and Q' is the number of modulation symbols for UCI in the current part.

303. Perform operations related to channel coding for the transport block (namely, data to be transmitted), CQI, RI, and HARQ-ACK, multiplexes the coded data and coded CQI, and performs channel interleaving for the multiplexed bits, coded bits of the RI, and coded bits of the HARQ-ACK.

304. Send the channel interleaved bits to the eNodeB after performing a series of operations such as scrambling, modulation, DFT, and resource mapping for the channel interleaved bits to complete transmission of the UCI.

The series of operations refer to the operations intended for wireless transmission between the terminal and the eNodeB, and are the same as the operations performed when the terminal sends only service data exclusive of the UCI. Therefore, the operations are not detailed here any further.

Each part of the UCI is sent as soon as this part has undergone the foregoing operations. Therefore, for N codewords, after one UCI is divided into N parts and the N parts are mapped onto the N codewords respectively, mapped signals are obtained, and the terminal sends the signals to the eNodeB, where N is a natural number and N>2.

In this embodiment, after the terminal finishes transmitting the UCI, the method may further include the following steps:

305. After receiving the signals from the terminal, the eNodeB performs a series of operations for the signals, to separate the UCI transmitting along with the data by performing channel deinterleaving and demultiplexing, and performs channel decoding to judge whether the transmission of the UCI is correct. If the transmission of the UCI is correct, the eNodeB obtains the original information bits of the UCI in the current part transmitted by the terminal.

306. After obtaining the parts of the UCI transmitted along with each codeword (namely, N parts of the UCI), the eNodeB combines the original information bits of the N parts into a complete UCI transmitted by the terminal so as to complete transmission of the UCI.

Figure 4:
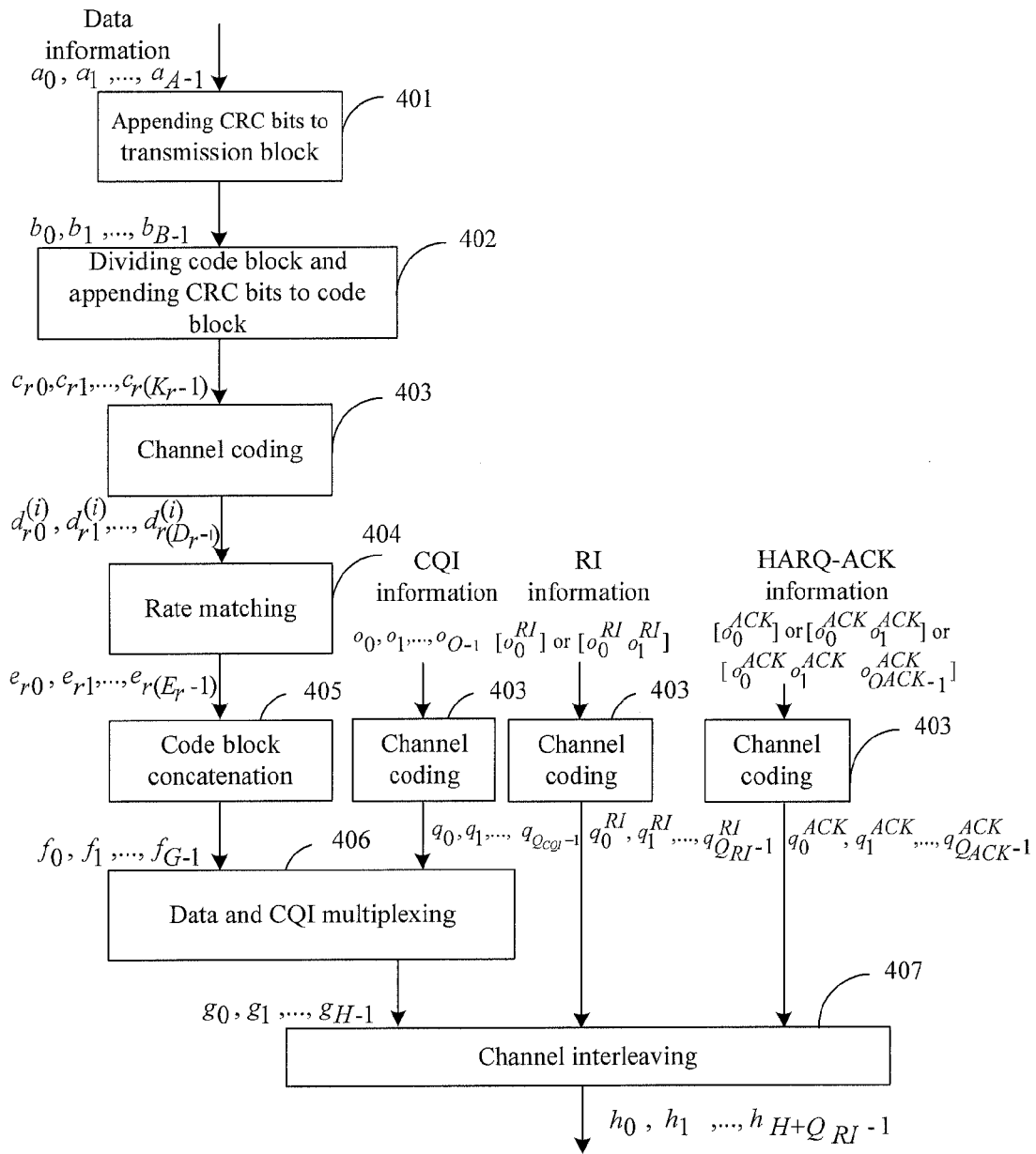
FIG. 4 is a flowchart of how a terminal performs operations related to channel coding for data and UCI according to embodiment 1 of the present invention.

As shown in FIG. 4, step 303 above may include the following detailed steps:

401. Append CRC bits to the transport block.

402. Divide the transport block into code blocks, and append CRC bits to each code block.

403. Perform channel coding for each code block.

404. Perform rate matching for the code blocks that have undergone channel coding.

405. Concatenate all the code blocks that have undergone rate matching.

Additionally, channel coding is performed for the UCI. The channel coding for the UCI may include channel coding for the CQI, channel coding for the RI, or channel coding for the HARQ-ACK. The sequence of steps 401 to 405 above is not limited by this step. If the UCI is CQI, steps 401 to 405 may have any sequence of occurrence so long as they occur before step 406. If the UCI is RI or HARQ-ACK, steps 401 to 405 may have any sequence of occurrence so long as they occur before step 407.

406. Multiplex the data after code block concatenation and the channel coded CQI.

407. Perform channel interleaving for the multiplexed bits, the channel coded RI, and the channel coded HARQ-ACK.

Figure 5:
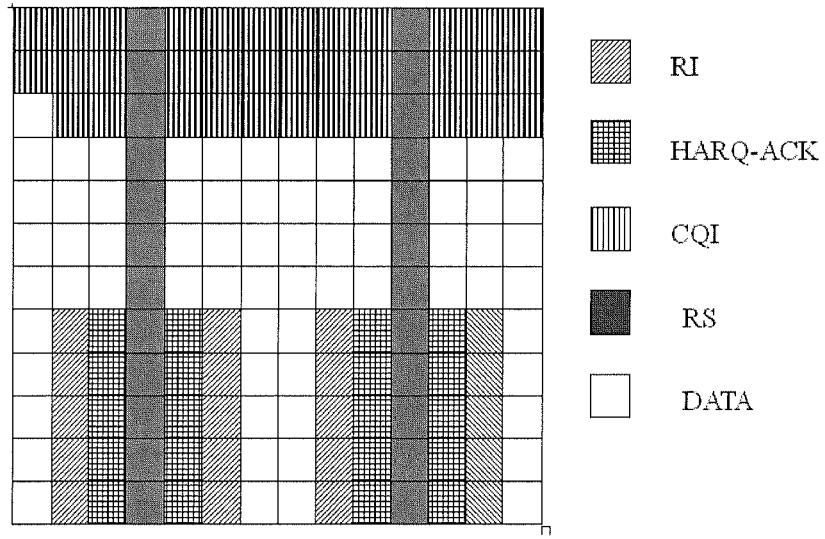
FIG. 5 is a schematic diagram of locations of data and UCI in a TTI after channel interleaving according to embodiment 1 of the present invention.

As a result of the channel interleaving, the time-frequency locations of the data and control information in a TTI are roughly illustrated in FIG. 5 after the PUSCH resource mapping. In FIG. 5, each small block represents a time-frequency resource element, the transverse axis represents time domain, and the vertical axis represents frequency domain.

The foregoing method is a solution to transmitting UCI on a PUSCH with multiple codewords. One UCI is divided into multiple parts and each part is transmitted along with a different codeword after being coded, and the transmit power of the terminal is made full use of. For example, the total transmit power of the terminal is up to 23 dBm, and the transmit power of each of the two antennas on the terminal is up to 20 dBm. Therefore, through the method in this embodiment, the UCI is divided into two parts, and the two parts are transmitted along with the two codewords. In this way, it is ensured that each antenna has UCI to be transmitted, and in this case, the transmit power for the UCI is up to 23 dBm. If the UCI is not divided into two parts but the UCI is transmitted along with one of the codewords, the UCI is transmitted on only one antenna at the same time. In this case, the transmit power for the UCI is up to 20 dBm only. Therefore, the method in this embodiment makes full use of the transmit power of the terminal. Besides, the method in this embodiment maintains backward-compatibility because it reuses the relevant standards of the LTE R8 and the transmitting procedure and the receiving procedure in the implementation as far as possible. The method in this embodiment can be implemented easily based on LTE R8, without involving too much additional work of standardization.

Embodiment 2

Figure 6:
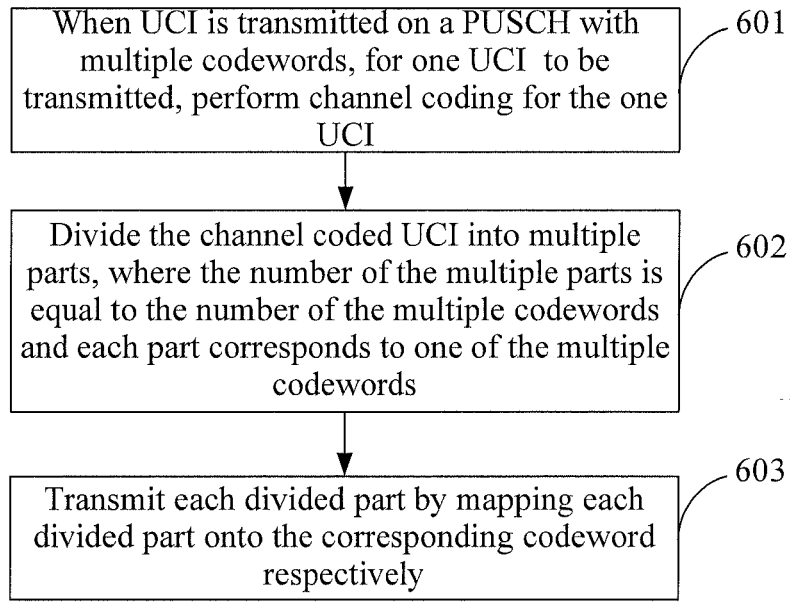
FIG. 6 is a flowchart of a method for transmitting UCI according to embodiment 2 of the present invention.

In embodiment 1 above, one UCI is divided into multiple parts for coding, which increases complexity of implementation compared with LTE R8. Moreover, the performance of the UCI is restricted by the performance of the parts of the UCI, and the probability of receiving the UCI correctly is lower than the probability of receiving any part of the UCI correctly. Therefore, as shown in FIG. 6, this embodiment provides another method for transmitting UCI. Unlike embodiment 1, embodiment 2 provides a method for dividing one channel coded UCI into multiple parts, and then transmits the multiple parts along with multiple codewords respectively. The method includes the following steps:

601. When UCI is transmitted on a PUSCH with multiple codewords, for one UCI to be transmitted, perform channel coding for the one UCI to be transmitted.

Specifically, the process of channel coding for the one UCI is as follows:

(1) Calculate the number (Q') of modulation symbols for the UCI on each codeword. Specifically, if the UCI is HARQ-ACK or RI, apply formula (4) for calculation; or, if the UCI is CQI, apply formula (5) for calculation. Formulae (4) and (5) are revised formulae of the corresponding formulae in LTE R8.

In this embodiment, the number of modulation symbols for the UCI on each codeword is the same, namely, is Q'.

$$Q' = \min\left(\left\lceil \frac{O \cdot M_{sc}^{PUSCH\text{-}initial} \cdot N_{symb}^{PUSCH\text{-}initial} \cdot \beta_{offset}^{PUSCH}}{\sum_{i=0}^{N_{CW}-1} \sum_{r=0}^{C_i-1} K_r} \right\rceil, 4 \cdot M_{sc}^{PUSCH}\right) \quad (4)$$

$$Q' = \min\left(\left\lceil \frac{(O+L) \cdot M_{sc}^{PUSCH\text{-}initial} \cdot N_{symb}^{PUSCH\text{-}initial} \cdot \beta_{offset}^{PUSCH}}{\sum_{i=0}^{N_{CW}-1} \sum_{r=0}^{C_i-1} K_r} \right\rceil, \right. \quad (5)$$

$$\left. M_{sc}^{PUSCH} \cdot N_{symb}^{PUSCH} - Q'_{RI}\right)$$

In the formulae above, O is the number of original information bits of UCI in the current part; $M_{sc}^{PUSCH-initial}$ is the transmission bandwidth for initial PUSCH transmission for the same transport block; $N_{symb}^{PUSCH-initial}$ is the number of SC-FDMAs for initial PUSCH transmission for the same transport block; $\beta_{offset}^{PUSCH}$ is an MCS offset of UCI in the current part; $M_{sc}^{PUSCH}$ is transmission bandwidth of the PUSCH; $K_r$ is a sum of the number of information bits of code block r of codeword i and the number of CRC bits; $C_i$ is the number of code blocks of codeword i; $N_{CW}$ is the number of codewords; $N_{symb}^{PUSCH1}$ is the number of SC-FDMAs for the same transport block; $Q_{RI}'$ is the number of modulation symbols for the RI on each codeword; L is the number of CRC bits, and L is 0 when the CQI is encoded by RM coding and L is 8 when the CQI is encoded by convolution coding; $Q_m$ is the modulation order; when the UCI is HARQ-ACK, $\beta_{offset}^{PUSCH}=\beta_{offset}^{HARQ-ACK}$; when the UCI is RI, $\beta_{offset}^{PUSCH}=\beta_{offset}^{RI}$; when the UCI is CQI, $\beta_{offset}^{PUSCH}=\beta_{offset}^{CQI}$.

In this embodiment, the UCI undergoes channel coding first, and is then divided into multiple parts. The channel coding performs only once. As shown in formulae (4) and (5), only one $\beta_{offset}^{PUSCH}$ value instead of multiple $\beta_{offset}^{PUSCH}$ values needs to be applied to calculation. The $\beta_{offset}^{PUSCH}$ value is sent by the eNodeB to the terminal. Therefore, this embodiment saves signaling overhead.

(2) Calculate the number (Q) of bits of the UCI after channel coding.

Specifically, apply formula (6) to calculate:

$$Q = \sum_{i=0}^{N_{CW}-1} Q_{mi} \cdot Q' \quad (6)$$

In the formula above, Q is the number of bits of the UCI after channel coding; $Q_{mi}$ is the modulation order of codeword i; and Q' is the number of modulation symbols for the UCI on each codeword.

(3) Perform channel coding for the UCI based on the number (Q) of bits of the UCI after channel coding.

602. Divide the channel coded UCI into multiple parts, where the number of the multiple parts is equal to the number of the multiple codewords and each part corresponds to one of the multiple codewords.

For example, there are N codewords (N is a natural number and N≥2). The channel coded UCI is divided into N parts: UCI1, UCI2, . . . , UCIN, which correspond to codeword 1, codeword 2, . . . , codeword N respectively.

The channel coded UCI may be divided into multiple parts in many methods. The methods of dividing are not limited herein. One of the methods is: The number of bits for each part on the corresponding codeword is calculated with $Q_{mi} \cdot Q'$, which represents the number of bits for part i on codeword i.

603. Transmitting each divided part by mapping each part onto the corresponding codeword respectively.

The detailed process is as follows:

(1) Perform channel coding for the transport blocks on each codeword respectively. For each codeword, multiplex the coded data and the part corresponding to the codeword among the parts of the CQI divided after channel coding; and perform channel interleaving for the multiplexed bits, the part corresponding to the codeword among the parts of the RI divided after channel coding, and the part corresponding to the codeword among the parts of the HARQ-ACK divided after channel coding.

(2) Send the channel interleaved bits to the eNodeB after performing a series of operations such as scrambling, modulation, DFT, and resource mapping for the channel interleaved bits. This step is the same as step 304, and is not repeated here any further.

(3) After receiving the signals from the terminal, the eNodeB performs a series of operations for the signals to separate part information of the UCI transmitting along with each codeword by performing channel deinterleaving and demultiplexing for each codeword, N parts information of the UCI corresponding to N codewords.

(4) Combine the obtained N parts of the UCI, and perform channel decoding for the UCI. If the decoding is correct, obtain the original information bits of the UCI transmitted by the terminal so as to complete transmission of the UCI.

Figure 7A:
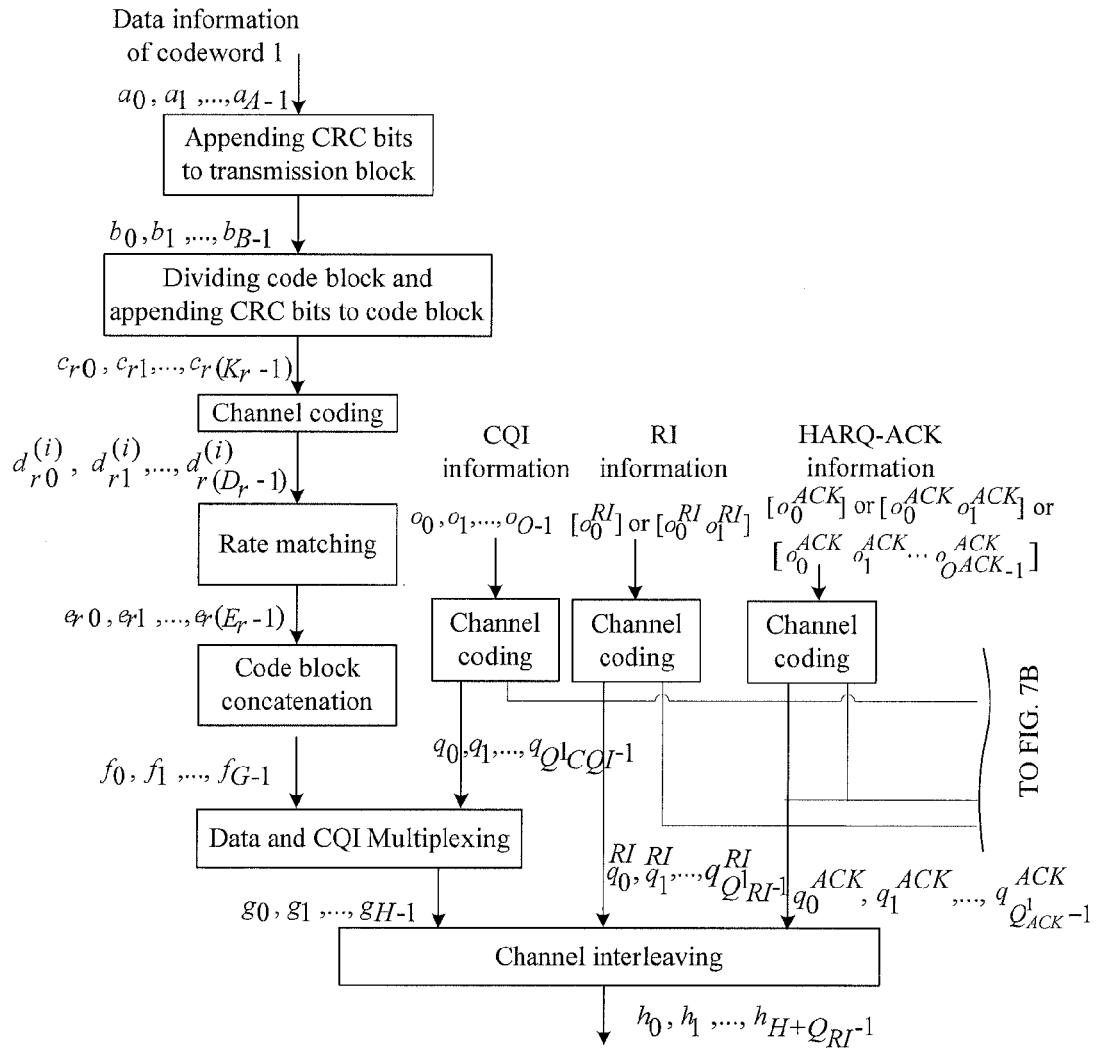
FIGS. 7A and 7B are a schematic flowchart of transmitting one UCI on two codewords according to embodiment 2 of the present invention.
Figure 7B:
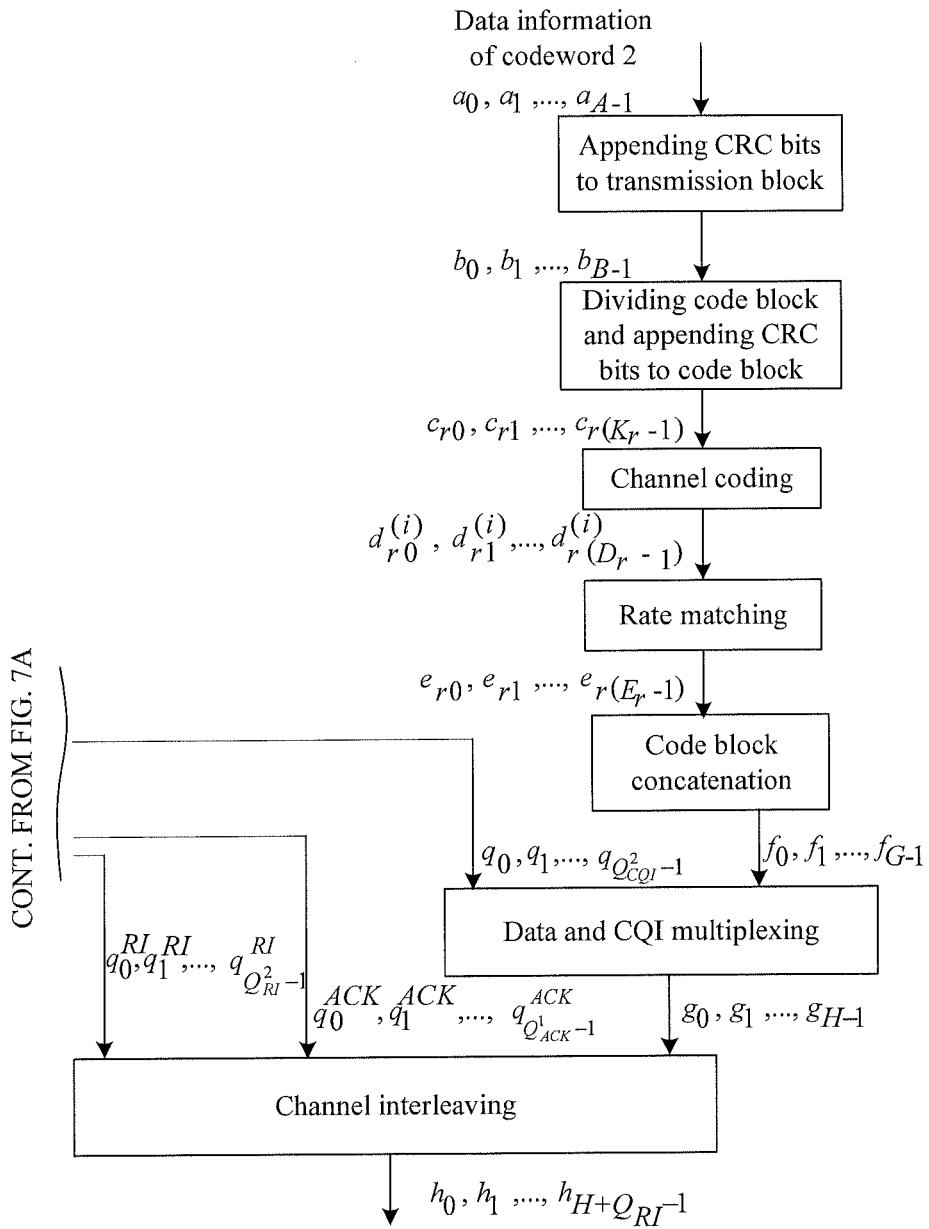

As shown in FIG. 7, taking two codewords for example, the detailed implementation process of the foregoing method is described. The transport blocks on two codewords undergo channel coding separately. UCI that undergoes channel coding includes CQI, RI, and HARQ-ACK. After the channel coding, the UCI is divided into two parts. One part is mapped onto the first codeword to be transmitted, and the other part is mapped onto the second codeword to be transmitted. The eNodeB performs channel deinterleaving and demultiplexing after receiving the two parts, and combines the two parts and performs channel decoding to obtain the original information bits of the UCI transmitted by the terminal.

The foregoing method is a solution to transmitting UCI on a PUSCH with multiple codewords. Like in embodiment 1, because one UCI is divided into multiple parts after channel coding and each part is transmitted along with a different codeword, the transmit power of the terminal is made full use of, and the reason is the same as that in embodiment 1. Compared with embodiment 1, embodiment 2 reduces the implementation complexity, improves the performance of the UCI, and can be implemented easily based on LTE R8, without involving too much additional work of standardization. In this embodiment, the UCI undergoes channel coding first, and is then divided into multiple parts. The channel coding performs only once. As shown in formulae (4) and (5), only one $\beta_{offset}^{PUSCH}$ value instead of multiple $\beta_{offset}^{PUSCH}$ values needs to be applied to calculation. The $\beta_{offset}^{PUSCH}$ value is notified by the eNodeB to the terminal. Therefore, the method according to this embodiment saves signaling overhead.

Embodiment 3

Figure 8:
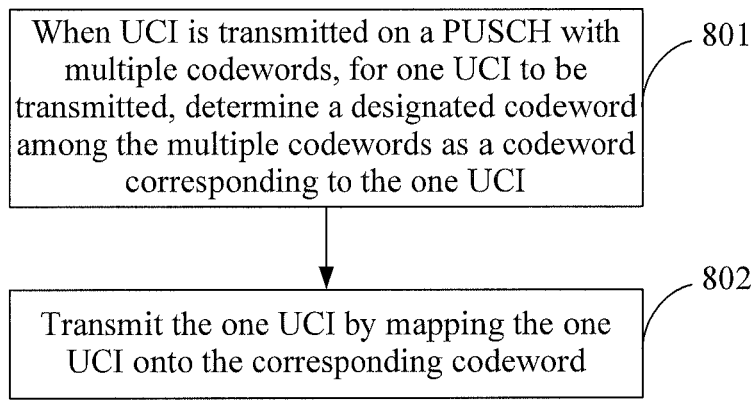
FIG. 8 is a flowchart of a method for transmitting UCI according to embodiment 3 of the present invention.

In embodiment 2, when the UCI is transmitted on the PUSCH, the sending procedure and the receiving procedure employed in LTE R8, need to be modified, which impedes reuse of the algorithm of LTE R8. Moreover, the formula for calculating the number of modulation symbols for the UCI and the formula for calculating the number of bits of the UCI after channel coding in LTE R8 need to be modified, namely, formulae (4) and formula (5) need to be modified. Generally, the RI and the HARQ-ACK have few original information bits, for example, 1 to 2 bits. In this case, additional repeated coding may be required for making the RI or HARQ-ACK transmissible along with multiple codewords, which leads to unnecessary resource waste. To solve such problems, this embodiment provides another method for transmitting UCI. Unlike embodiment 1 and embodiment 2, embodiment 3 employs a method of transmitting UCI by mapping one UCI onto one codeword. As shown in FIG. 8, the method in this embodiment includes the following steps:

801. When UCI is transmitted on a PUSCH with multiple codewords, for one UCI to be transmitted, determine a designated codeword among multiple codewords as a codeword corresponding to the one UCI to be transmitted.

The designated codeword may be a codeword designated by the terminal, or a codeword indicated by an Uplink (UL) Grant, or a codeword notified by a signaling from an eNodeB, for example, notified by a Radio Resource Control (RRC) signaling. Specifically, the UL Grant may indicate the codeword explicitly or implicitly through a field in the UL Grant, for example, indicate the codeword explicitly by adding a field in the UL Grant, or indicate the codeword through an MCS field implicitly. The terminal can determine the corresponding codeword according to the value of the MCS field. The UL Grant is obtained by the terminal by receiving a downlink control signaling from the eNodeB.

802. Transmit the UCI by mapping the UCI onto the corresponding codeword.

Specifically, this process may include the following steps:

(1) Based on the MCS of the determined codeword, calculate the number of modulation symbols for the UCI. If the UCI is HARQ-ACK or RI, apply formula (1) for calculation; or, if the UCI is CQI, apply formula (2) for calculation.

(2) Calculate the number of bits of the UCI after channel coding. The calculation may be performed through formula (3) based on the number of modulation symbols for the UCI calculated in the previous step.

(3) Perform operations related to channel coding for the UCI and the data respectively, and perform multiplexing and channel interleaving. Then perform a series of operations such as scrambling, modulation, DFT, and resource mapping, and then send to the eNodeB. This step is the same as steps 303 to 304, and is not repeated here any further.

(5) After receiving signals from the terminal, the eNodeB performs channel deinterleaving and demultiplexing to separate the UCI transmitted along with the codeword, and perform channel decoding to judge whether the transmission of the UCI is correct. If the transmission of the UCI is correct, obtain the UCI information transmitted by the terminal. This step is the same as step 305, and is not repeated here any further.

The foregoing method is a solution to transmitting UCI on a PUSCH with multiple codewords. In this embodiment, one UCI is transmitted by mapping to one codeword. Compared with embodiment 2, the method employed in embodiment 3 involves no modification of the algorithm of LTE R8, and maintains backward-compatibility because it reuses the relevant standards of the LTE R8 and the transmitting procedure and the receiving procedure in the implementation as far as possible. The method in this embodiment can be implemented easily based on LTE R8, without involving too much additional work of standardization. For the UCI with few original information bits, additional repeated coding is avoided, and resources are saved.

Embodiment 4

In this embodiment, UCI to be transmitted from the terminal may be UCI intended for one downlink carrier or UCI intended for multiple downlink carriers. The UCI of multiple downlink carriers may be coded independently or jointly. Joint coding includes joint coding for UCI of all downlink carriers, or joint coding for UCI of some of all downlink carriers. In the case of independent coding, the UCI of each downlink carrier undergoes channel coding respectively. In the case of joint coding, the UCI of multiple downlink carriers undergo channel coding jointly once.

Figure 9:
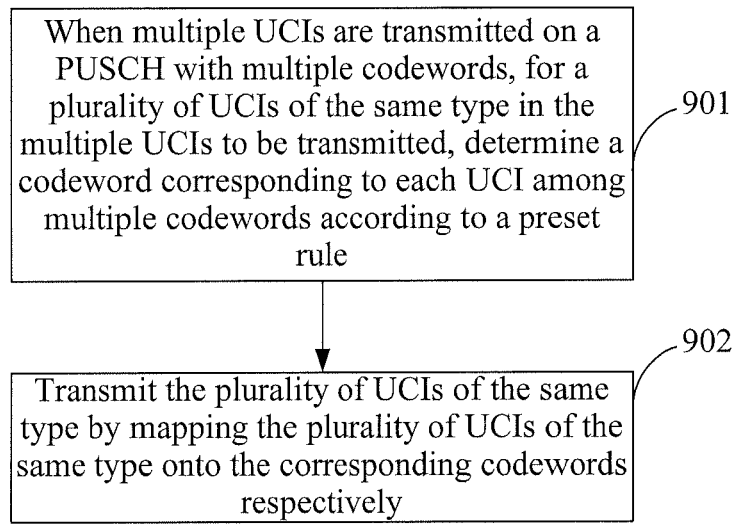
FIG. 9 is a flowchart of a method for transmitting UCI according to embodiment 4 of the present invention.

On the basis of embodiment 3, for the scenario of transmitting multiple UCIs from the terminal, in addition to adopting the method according to embodiment 3, this embodiment provides another method for transmitting UCI. As shown in FIG. 9, the method in this embodiment includes the following steps:

901. When multiple UCIs are transmitted on a PUSCH with multiple codewords, for a plurality of UCIs of the same type in the multiple UCIs to be transmitted, determine a codeword corresponding to each UCI among multiple codewords according to a preset rule. The preset rule is as follows:

If the number of multiple UCIs of the same type M is divisible by the number of codewords N, the M UCIs fall into N groups, each group corresponds to one codeword in the N codewords, and each group includes M/N UCIs. For example, if M=4 and N=2, M/N=2, and therefore, the 4 UCIs fall into two groups, each group includes 2 UCIs, the first group corresponds to the first codeword, and the second group corresponds to the second codeword.

If M<N and M/N is not an integer, M codewords are selected out of the N codewords in a designated sequence. The M UCIs correspond to the M codewords, and each UCI corresponds to a codeword. For example, if M=2 and N=3, 2 codewords are selected out of 3 codewords in a designated sequence, 2 UCIs are mapped to the 2 codewords, and the remaining codeword has no UCI information but transmits data only.

If M is greater than N and the result of dividing M by N is a non-integer number including a quotient X and a remainder Y, the M UCIs fall into N groups, each group corresponds to one of the N codewords, and each group includes X UCIs. Afterward, Y codewords are selected out of the N codewords in a designated sequence, and the remaining Y UCIs after dividing group are mapped onto the Y codewords. Each UCI corresponds to a codeword. For example, if M=7 and N=3, the result of dividing M by N includes a quotient 2 and a remainder 1, the UCIs fall into 3 groups, each group includes 2 UCIs, and the 3 groups correspond to 3 codewords respectively. In this case, one UCI remains, 1 codeword is selected out of the 3 codewords in a designated sequence, and the remaining UCI is mapped to the selected codeword. If the number of remaining UCIs is plural such as Z, Z codewords are selected in a designated sequence, and the remaining Z UCIs are mapped onto the Z codewords.

M, N, X, Y and Z are all natural numbers, and N is not less than 2.

The designated sequence involved in the foregoing steps may be: a sequence from a high MCS level to a low MSC level corresponding to the codewords or a sequence from a low MCS level to a high MSC level corresponding to the codewords.

902. Transmit the UCIs by mapping the UCIs onto the corresponding codewords respectively.

In the foregoing rules in this embodiment, the terminal may transmit one of the UCIs by further mapping one of the UCIs onto the designated codeword. The designated codeword may be a codeword designated by the terminal, or a codeword indicated explicitly or implicitly by a field in the UL Grant, or a codeword notified by signaling from the eNodeB. That is, the terminal can ensure that one of the UCIs is mapped onto the designated codeword on the basis of fulfilling the foregoing rules.

In the method provided in this embodiment, multiple UCIs are transmitted by mapping the multiple UCIs evenly onto corresponding codewords in the designated sequence, without being divided into parts, and one or more UCIs are mapped onto one codeword, which provides a solution to transmitting multiple UCIs on a PUSCH with multiple codewords. Moreover, the solution maintains backward-compatibility because it reuses the relevant standards of the LTE R8 and the transmitting procedure and the receiving procedure in the implementation as far as possible. The method in this embodiment can be implemented easily based on LTE R8, without involving too much additional work of standardization. Multiple UCIs are mapped onto multiple codewords, so as to prevent the following case: multiple UCIs are mapped onto one codeword, resulting in that a large number of resources are for the UCIs, resources available to data are scarce, and the amount of data to be borne is very small. Moreover, if multiple UCIs are mapped onto one codeword, when the current data transmission fails, this tiny amount of data needs to be retransmitted on the same resource. If no new UCI needs to be transmitted at the time of retransmission, the data is to be retransmitted at a very low code rate, which leads to waste of resources. Therefore, the method provided in this embodiment also reduces unnecessary waste of resources caused by data retransmission effectively.

Embodiment 5

Figure 10:
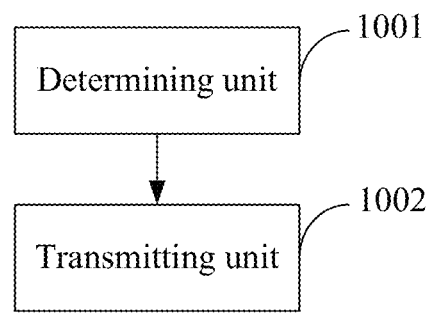
FIG. 10 is a structure diagram of an apparatus for transmitting UCI according to embodiment 5 of the present invention.

As shown in FIG. 10, an apparatus for transmitting UCI in this embodiment includes:

a determining unit 1001, configured to determine a codeword corresponding to the UCI among multiple codewords according to a preset rule when the UCI is transmitted on a PUSCH with multiple codewords; and a transmitting unit 1002, configured to transmit the UCI by mapping the UCI onto the corresponding codeword.

Figure 11:
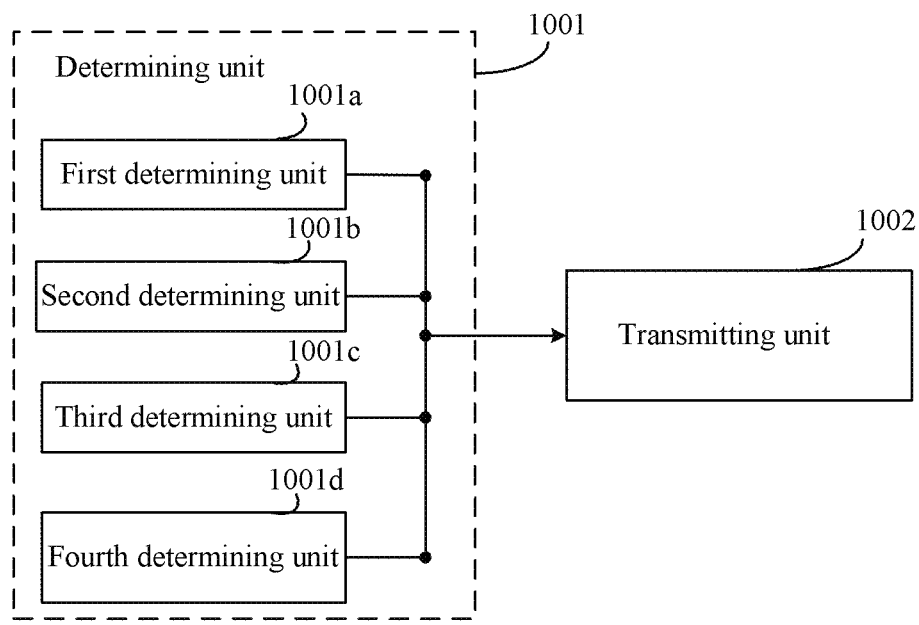
FIG. 11 is another structure diagram of an apparatus for transmitting UCI according to embodiment 5 of the present invention.

As shown in FIG. 11, in this embodiment, the determining unit 1001 may further include:

a first determining unit 1001a, configured to determine, for one UCI to be transmitted, a designated codeword among multiple codewords as a codeword corresponding to the one UCI when UCI is transmitted on a PUSCH with multiple codewords, where the designated codeword is a codeword designated by a terminal, or a codeword indicated by an UL Grant, or a codeword notified by signaling from an eNodeB. The codeword may be indicated explicitly or implicitly by one field in the UL Grant.

Alternatively, the determining unit 1001 further includes:

a second determining unit 1001b, configured to divide, for one UCI to be transmitted, the one UCI into multiple parts when UCI is transmitted on a PUSCH with multiple codewords, where the number of the parts is equal to the number of codewords and each part corresponds to one of the codewords.

Alternatively, the determining unit 1001 further includes:

a third determining unit 1001c, configured to perform, for one UCI to be transmitted, channel coding for the one UCI when UCI is transmitted on a PUSCH with multiple codewords, and divide the channel coded UCI into multiple parts, where the number of the parts is equal to the number of codewords and each part corresponds to one of the codewords.

Alternatively, the determining unit 1001 further includes:

a fourth determining unit 1001d, configured to: divide, for a plurality of UCIs of the same type in UCI to be transmitted when the UCI is transmitted on a PUSCH with multiple codewords, M UCIs into N groups if the number of the plurality of the UCIs of the same type M is divisible by the number of codewords N, where each group corresponds to one of N codewords, and each group includes M/N UCIs; if M<N and M/N is a non-integer number, select M codewords out of the N codewords in a designated sequence, and map the M UCIs onto the M codewords, where each UCI corresponds to a codeword; if M is greater than N and the result of dividing M by N is a non-integer number including a quotient X and a remainder Y, divide the M UCIs into N groups, where each group corresponds one of the N codewords, and each group includes X UCIs; and select Y codewords out of the N codewords in the designated sequence, and map the remaining Y UCIs after dividing group onto the Y codewords, where each UCI corresponds to a codeword, M and N are natural numbers, and N is not less than 2.

For the second determining unit 1001b or the third determining unit 1001c, the transmitting unit 1002 is further configured to transmit each part of the UCI by mapping each part of the UCI onto the corresponding codeword respectively.

In this embodiment, the designated sequence is: a sequence from a high MCS level to a low MSC level corresponding to the codewords or a sequence from a low MCS level to a high MSC level corresponding to the codewords.

Any apparatus provided in this embodiment of the present invention may be integrated in a terminal which communicates with an eNodeB over the air.

The method in this embodiment is a solution to transmitting one or more UCIs on a PUSCH with multiple codewords, and maintains backward-compatibility because it reuses the relevant standards of the LTE R8 and the transmitting procedure and the receiving procedure in the implementation as far as possible. The method in this embodiment can be implemented easily based on LTE R8, without involving too much additional work of standardization. Because multiple UCIs are mapped onto multiple codewords, more resources are available to data, and the resource waste caused by retransmission of data is reduced effectively.

Persons of ordinary skill in the art should understand that all or part of the technical solutions provided in the embodiments of the present invention may be implemented by a program instructing relevant hardware. The program may be stored in computer-readable storage media, and the storage media may be any media capable of storing program codes, such as Read Only Memory (ROM), Random Access Memory (RAM), magnetic disk, or optical disk.

The above descriptions are merely exemplary embodiments of the present invention, but are not intended to limit the scope of the present invention. Any modifications, variations or replacement that can be easily derived by those skilled in the art without departing from the spirit and scope of the invention shall fall within the protection scope of the present invention.

What is claimed is:

1. A method for transmitting Channel Quality Information (CQI), comprising:

selecting, by a terminal, one transport block (TB) from two TBs to be transmitted to a base station in a first transmission time interval (TTI), in response to an uplink (UL) grant, wherein a modulation and coding scheme (MCS) field in the UL grant indicates which TB, from the two TBs, shall be selected by the terminal for transmitting the CQI;

mapping, by the terminal, the CQI onto the selected TB; and transmitting, by the terminal, the two TBs in the first TTI on a physical uplink shared channel (PUSCH) to the base station.

2. The method of transmitting CQI according to claim 1, wherein the CQI is encoded by either a Reed-Muller (RM) coding or a convolution coding.

3. The method of claim 1, further comprising channel coding CQI and HARQ-ACK data in the selected TB.

4. The method of claim 3, further comprising multiplexing the coded data and coded CQI.

5. The method of claim 4, further comprising interleaving the multiplexed bits and coded bits of the HARQ-ACK.

6. A terminal for transmitting Channel Quality Information (CQI), comprising:

memory to store a program; and computer hardware configured, including configured by the program, to:

select one transport block (TB) from two TBs to be transmitted to a base station in a first transmission time interval (TTI) in response to an uplink (UL) grant, wherein a modulation and coding scheme (MCS) field in the UL grant indicates which TB, from the two TBs, shall be selected by the terminal for transmitting the CQI;

map the CQI onto the selected TB; and transmit the two TBs in the first TTI on a physical uplink shared channel (PUSCH) to the base station.

7. The apparatus claim 6, wherein the CQI is encoded by either a Reed-Muller (RM) coding or a convolution coding.

8. A method for obtaining channel quality information (CQI), comprising:

selecting, by an eNodeB, according to a rule, one transport block (TB) from two TBs to be received from a terminal in a first transmission time interval (TTI);

sending, by the eNodeB, an uplink (UL) grant to the terminal, wherein a modulation and coding scheme (MCS) field in the UL grant indicates the TB selected according to the rule shall be used for transmitting the CQI;

receiving, by the eNodeB, the two TBs from the terminal on a physical uplink shared channel (PUSCH) in the first TTI, wherein the CQI is mapped onto the TB selected according to the rule;

obtaining, by the eNodeB, from among the received two TBs, the CQI from the TB selected according to the rule.

9. The method of claim 8, wherein the CQI is encoded by either a Reed-Muller (RM) coding or a convolution coding.

10. The method of claim 8, further comprising performing channel deinterleaving and demultiplexing to separate the CQI from the selected TB.

11. The method of claim 8, further comprising judging whether the CQI is correct.

12. A base station for obtaining channel quality information (CQI), comprising:

a processor;

a transceiver; and a memory storing programming for execution by the processor and the transceiver, the programming including instructions to:

select, according to a rule, one transport block (TB) from two TBs to be received from a terminal in a first transmission time interval (TTI);

send an uplink (UL) grant to the terminal, wherein a modulation and coding scheme (MCS) field in the UL grant indicates the TB selected according to the rule shall be used for transmitting the CQI;

receive the two TBs from the terminal on a physical uplink shared channel (PUSCH) in the first TTI, wherein the CQI is mapped onto the TB selected according to the rule; and obtain, from among the received two TBs, the CQI from the TB selected according to the rule.

13. The apparatus of claim 12, wherein the CQI is encoded by either a Reed-Muller (RM) coding or a convolution coding.

* * * * *